United States Patent
Notarianni

(10) Patent No.: US 8,150,332 B2
(45) Date of Patent: Apr. 3, 2012

(54) METHOD AND SYSTEM FOR LOW-FREQUENCY COMMUNICATION

(75) Inventor: Michael Notarianni, Créteil Cedex (FR)

(73) Assignee: Valeo Securite Habitacle, Créteil Cedex (FR)

(*) Notice: Subject to any disclaimer, the term of this patent is extended or adjusted under 35 U.S.C. 154(b) by 862 days.

(21) Appl. No.: 12/097,981

(22) PCT Filed: Dec. 21, 2006

(86) PCT No.: PCT/FR2006/002832
§ 371 (c)(1),
(2), (4) Date: Sep. 9, 2008

(87) PCT Pub. No.: WO2007/077347
PCT Pub. Date: Jul. 12, 2007

(65) Prior Publication Data
US 2009/0156132 A1   Jun. 18, 2009

(30) Foreign Application Priority Data
Dec. 22, 2005   (FR) ...................................... 05 13233

(51) Int. Cl.
*H04B 1/00* (2006.01)
*H04B 7/00* (2006.01)

(52) U.S. Cl. ............................. 455/70; 455/41.2; 455/68
(58) Field of Classification Search ........................ None
See application file for complete search history.

(56) References Cited

U.S. PATENT DOCUMENTS

| 4,277,710 | A | * | 7/1981 | Harwood et al. | 310/316.01 |
|---|---|---|---|---|---|
| 4,458,248 | A | * | 7/1984 | Lyasko | 343/719 |
| 4,947,407 | A | * | 8/1990 | Silvian | 375/340 |
| 5,132,633 | A | * | 7/1992 | Wong et al. | 327/113 |
| 5,212,815 | A | * | 5/1993 | Schumacher | 455/126 |
| 5,583,402 | A | * | 12/1996 | Moisin et al. | 315/307 |
| 2001/0033576 | A1 | * | 10/2001 | Richards | 370/442 |
| 2006/0007719 | A1 | * | 1/2006 | Shannon et al. | 363/132 |

OTHER PUBLICATIONS

Yu-Kang Lo, "Varying Duty Cycle Control for Discontinuous conduction mode boost rectifiers", Oct. 2001, IEEE, vol. 4, pp. 149-151.*
International Search Report with English Translation from PCT/FR2006/002832 dated May 11, 2007 (2 pages).
Auvray, J.; "Electronique Des Signaux Analogiques"; 1980, Bordas, Paris, XP002403049, pp. 6-9 (4 pages).
Zverev, Anatol I.; "Handbook of Filters Synthesis"; 1967, John Wiley & Sons, Inc.; XP002403050, p. 11 (1 page).

* cited by examiner

*Primary Examiner* — Yuwen Pan
*Assistant Examiner* — Ayodeji Ayotunde
(74) *Attorney, Agent, or Firm* — Osha • Liang LLP

(57) ABSTRACT

The disclosure relates to a method of communication between a control device and an operator device, including the generation of a control signal and transmission of the control signal, where the control signal is generated in the form of a symmetric signal and is then filtered by the transmission system.

8 Claims, 3 Drawing Sheets

METHOD AND SYSTEM FOR LOW-FREQUENCY COMMUNICATION

FIELD OF THE INVENTION

The present invention relates to a method for low-frequency (LF) communication. It also applies to a low-frequency communication system implementing this method.

This method aims in particular at the reduction of a noise level of a communication system comprising transmission from a transmitter to a receiver of a control signal intended to control a device located at the receiver or a device located downstream of the receiver.

The invention applies more precisely to the field of automobiles and communication systems in a vehicle. Among the systems the invention relates to, hands-free access systems, magnetic shielding systems, transponders and systems using emissions from resonant systems may be cited.

BACKGROUND ART

Currently, in order to be able to generate a low-frequency (LF) shield around or inside a vehicle from one or more coordinated LF antennas, the transmitters must work with a control signal with a variable duty cycle centered around the resonant frequency of the antenna in question. The LF transmission system filters this control signal with a band-pass filter so as to extract the fundamental harmonic from it and to generate a current necessary for the creation of a magnetic field.

Depending on the passband of the band-pass filter used and on the type of control signal, the harmonics at transmission are filtered more or less. In an unfavorable case, an asymmetric control signal linked with a large passband will allow unwanted harmonics and hence noise to pass.

SUMMARY OF THE INVENTION

One objective of the invention is to propose a method of communication between a control device and an operator device enabling the number of harmonics at transmission to be reduced, and hence the noise level in transmission to be reduced whatever the duty cycle of the control signal.

Another objective of the invention is to reduce the richness of the transmitted signal and hence the noise level in transmission.

In addition, the invention aims to propose a method which is very quick to implement and of low cost.

Finally, the invention proposes a method for reducing the noise level in transmission without major change to the communication system.

Thus a method of communication between a control device and an operator device is proposed, comprising generation of a control signal and transmission of this control signal, characterized in that the control signal is generated in the form of a symmetric signal and is then filtered before its transmission.

The method according to the invention is very useful as it enables the noise level in transmission of a control signal within a communication system to be reduced by using a symmetric signal as a control signal.

A control device is here understood to be any device provided to generate and transmit one or more control signals intended to be received and exploited by equipment.

An operator device is here understood to be any device provided to carry out one or more operations or actions, whatever their nature, in response to receiving one or more control signals.

In addition, thanks to the method according to the invention, the noise reduction is produced without installing expensive systems. In fact, the method according to the invention is compatible with the majority of existing systems and can be implemented very quickly.

The method according to the invention allows more effective control of a device within a transmission system thanks to the generation of a symmetric signal which, after sufficient processing, has less noise and is therefore more efficient. In addition, the processing carried out is quick and simple to implement.

Advantageously, the control signal may be a signal with a variable duty cycle. This means that there is no limit to a signal with a fixed duty cycle and hence widens the field of application of the method according to the invention.

In an advantageous version of the invention, the control signal may be a frequency signal centered around the resonant frequency of a device or a system that is resonant in transmission or in reception. The resonant system or device may in particular comprise one or more resonant antennas.

In the particular example of the generation of an LF shield around or inside a vehicle from one or more coordinated LF antennas, the transmitters must work with a control signal with a variable duty cycle centered around the resonant frequency of the antenna(s). Hence, the utility, for the method according to the invention, of the control signal being centered around a resonant frequency is understandable.

The resonant device may also comprise a transponder.

Advantageously, the filtering step may comprise filtering of the control signal by at least one band-pass filter. This band-pass filtering may be carried out to "purify" the signal by cancelling some of its unwanted components. The filtering of the signal may, in particular, be carried out by an RLC band-pass filter.

According to an advantageous specific feature of the method according to the invention, the filtering step may comprise a cancellation of at least one even harmonic of the control signal. In fact, the filtering may comprise cancellation of some unwanted harmonics of the control signal. This enables the noise level of the signal to be reduced. These harmonics may be even harmonics but also at least one harmonic not lying in the passband of the filter. In a similar manner, the filtering may comprise cancellation of harmonics of order k:

$$k = \frac{F_0}{\delta}$$

with $F_0$ a resonant frequency of a device or a system within the transmission system and $\delta$ the duty cycle of the control signal.

In addition, the filtering step comprises extraction of the fundamental harmonic from the control signal. This is because the fundamental harmonic of the control signal includes useful information. It is important to be able to extract it in order to be able to exploit it. The extraction may be accompanied by at least one of the operations mentioned above.

According to an advantageous version of the method according to the invention, the communication system may be a low-frequency communication system. The method according to the invention may therefore be employed with low frequency signals.

Advantageously, the transmission system may comprise at least one antenna for transmitting the control signal or any other signal generated depending on the control signal. In fact, the transmission system may rely on wave communication. The control signal may then be sent from at least one transmitter to a receiver, thanks to one or more antennas, with the aim of triggering an operation at the level of the receiver. In a similar manner, the control signal may serve to control the sending from at least one transmitter to a receiver, thanks to one or more transmission and reception antennas, of any signal generated depending on the control signal.

The control signal may advantageously enable symmetric control of at least two transmission drivers. These drivers may control transmission of signals, for example, on two antennas or on two transmitters toward at least one receiver corresponding to these transmitters.

In addition, the control signal may be of any type, and in particular a square-pulse signal.

According to another aspect of the invention, a system of communication from a control device to a receiver device is proposed, comprising:

means for generating said control signal; and
means for transmitting said control signal;

characterized in that the generation means are set up to generate a symmetric control signal, and in that it furthermore comprises means for filtering said generated control signal upstream of the transmission means.

According to a specific feature of the invention, the filtering means may comprise an RLC band-pass filter comprising one or more resistive, inductive or capacitive elements. The band-pass filter may be of any order and may be chosen depending on requirements.

BRIEF DESCRIPTION OF THE DRAWINGS

Other advantages and features will appear on examining the detailed description of an embodiment that is in no way limiting and the appended drawings in which.

DETAILED DESCRIPTION

Figure 1:
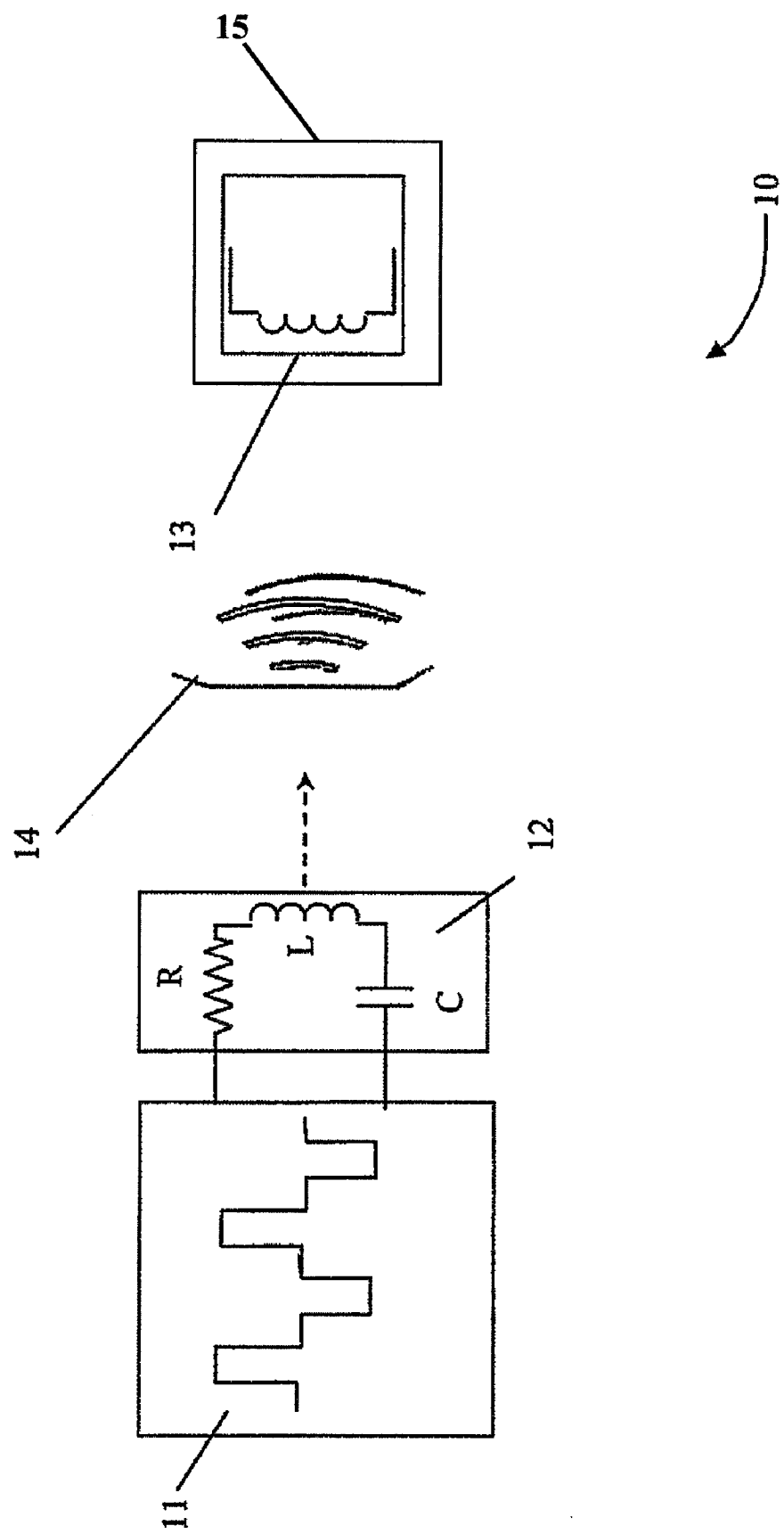
FIG. 1 presents an example of a communication system according to the invention.

An example of a communication system 10 according to the invention is presented in FIG. 1. This figure schematically represents a control signal generator 11, a band-pass filter 12, a complementary device 13, a transmission antenna 14 and a receiver 15.

In order to generate an LF shield around or inside a vehicle from one or more coordinated LF antennas 14, the transmitters must work with a control signal with a variable duty cycle centered around the resonant frequency of the antenna 14 and generated by the generator 11. The LF transmission system then filters this control signal with a band-pass filter 12 so as to extract the fundamental harmonic from it and to generate a current necessary for the creation of a magnetic field through a complementary device 13, for example.

Figure 2:
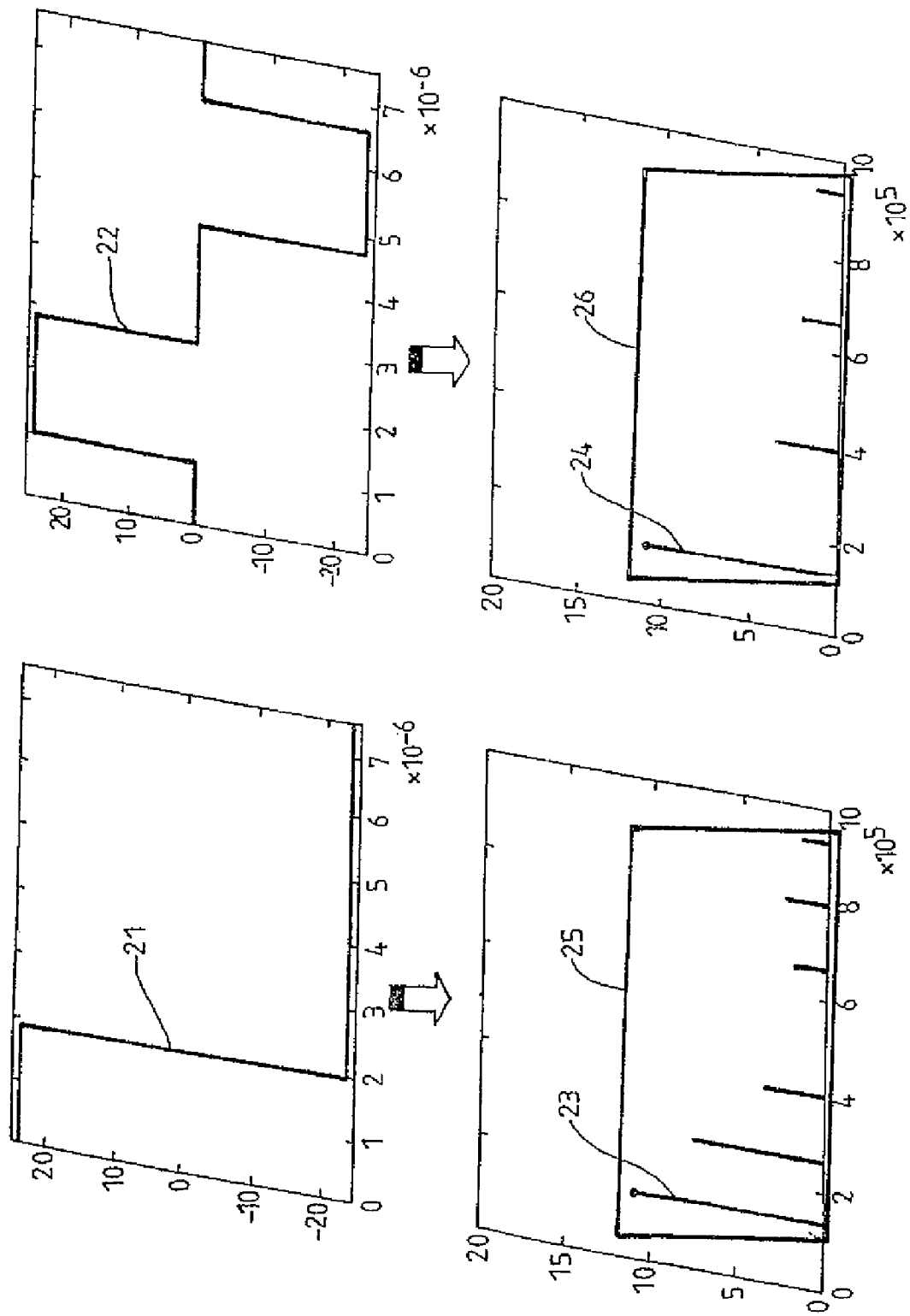
FIG. 2 presents an example of symmetric and asymmetric square-pulse signals, with duty cycles δ=¼ and the respective harmonics of these signals, employed in the communication method according to the invention.

In order to do this, the control signal used is a symmetric signal conforming with the method according to the invention. FIG. 2 presents, for a duty cycle δ=¼, a symmetric control signal 22 and an asymmetric control signal 21 by way of comparison, each of these signals being represented in relation to a vertical axis and a horizontal axis, respectively representing the amplitude of these signals in volts (V) and the time in seconds (s).

Still in FIG. 2, for each control signal 21 and 22 the respective harmonics 25 and 26 and the respective fundamental harmonics 23 and 24 of these signals are represented after band-pass filtering. Each of these representations is produced in relation to a vertical axis and a horizontal axis, respectively representing the amplitude in V and the frequency in Hertz (Hz). It will thus be noted that after the band-pass filtering, for a duty cycle δ=¼, the asymmetric signal 21 has six harmonics 25, while the symmetric signal 22 only has four. The symmetric signal is hence less rich and includes less noise.

Figure 3:
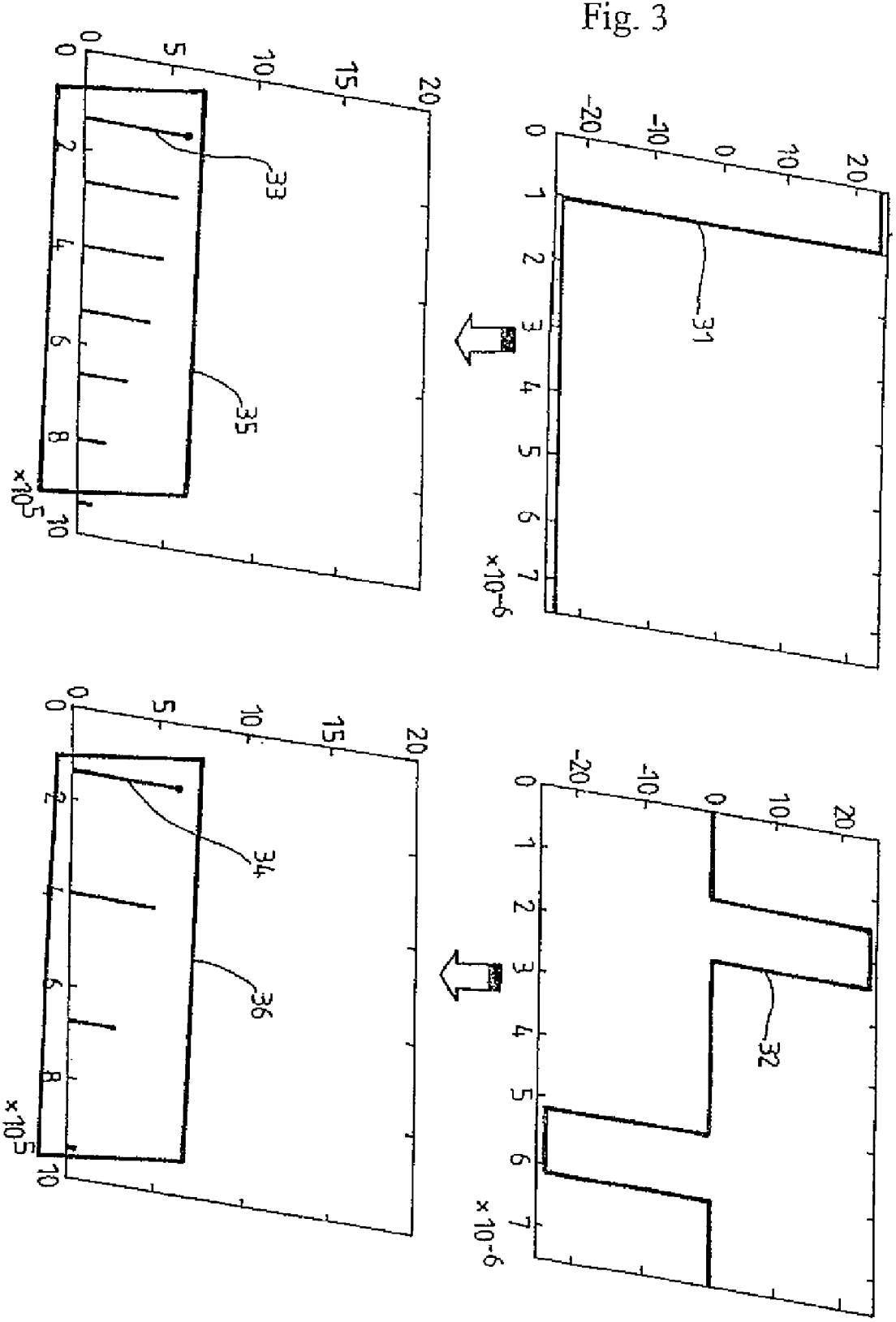
FIG. 3 presents an example of symmetric and asymmetric square-pulse signals, with duty cycles δ=⅛ and the respective harmonics of these signals, employed in the communication method according to the invention.

In a similar manner, FIG. 3 presents, for a duty cycle δ=⅛, a symmetric control signal 32 and an asymmetric control signal 31 by way of comparison, each of these signals being represented in relation to a vertical axis and a horizontal axis, respectively representing the amplitude of these signals in V and the time in s.

Still in FIG. 3, for each control signal 31 and 32 the respective harmonics 35 and 36 and the respective fundamental harmonics 33 and 34 of these signals are represented after band-pass filtering, each of these representations being produced in relation to a vertical axis and a horizontal axis, respectively representing the amplitude in V and the frequency in Hz. It will thus be noted that after the band-pass filtering, for a duty cycle δ=⅛, the asymmetric signal 31 has seven harmonics, while the symmetric signal 32 only has four. The symmetric signal is hence less rich and includes less noise.

The use of a symmetric signal of variable duty cycle enables elimination, after band-pass filtering, of the even harmonics and the harmonics of order k:

$$k = \frac{F_0}{\delta}$$

with $F_0$ the resonant frequency of the antenna 14 and δ the duty cycle of the control signal. In relation to an asymmetric signal, the symmetric signal therefore has fewer harmonics at the output of the band-pass filter.

The invention is not limited to the example that has just been described. The field of application of the method is very wide and encompasses all communication systems comprising the triggering of an operation by using at least one control signal.

The invention claimed is:

1. A method of communication between a control device and an operator device, comprising:

generation and transmission of a control signal, by the control device, wherein the control signal is transmitted to the operator device, which is configured to perform at least one operation in response to receiving the control signal, wherein the control signal is generated in the form of a symmetric signal and is then filtered by a low frequency (LF) transmission system, wherein the control signal lacks even harmonics and harmonics that are a multiple order k, with $$k = \frac{F_0}{\delta},$$

wherein $F_0$ represents the resonant frequency of the antenna within the transmission system, and wherein δ is the duty cycle of the control signal.

2. The method as claimed in claim 1, wherein the control signal is a signal with a given duty cycle.

3. The method as claimed in claim 1, wherein the control signal is a frequency signal centered around a device or a system that is resonant in transmission or in reception.

4. The method as claimed in claim 1, wherein the step of filtering the control signal comprises filtering of the control signal by the LF transmission system.

5. The method as claimed in claim 1, wherein the filtering step further comprises extraction of the fundamental from the control signal and of its neighboring harmonics, comprised in the passband of the filter.

6. The method as claimed in claim 1, wherein the communication system is a low-frequency radio-wave communication system, with a frequency range from 125 kHz to 135 kHz.

7. The method as claimed in claim 1, wherein the control signal enables symmetric control, for a given duty cycle, of at least one transmitter.

8. A system of communication from a control device to an operator device, comprising:

the control device configured to generate and transmit said control signal;

the operator device configured to receive said control signal and perform at least one operation in response to receiving the control signal, wherein the control device is configured to generate a symmetric control signal; and a low frequency (LF) transmission system configured to filter said generated control signal, wherein the control signal lacks even harmonics and harmonics that are a multiple order k, with $$k = \frac{F_0}{\delta},$$

wherein $F_0$ represents the resonant frequency of the antenna within the transmission system, and wherein $\delta$ is the duty cycle of the control signal.

* * * * *